United States Patent [19]
Conway et al.

[11] Patent Number: 5,278,779
[45] Date of Patent: Jan. 11, 1994

[54] LAPTOP COMPUTER WITH HINGED KEYBOARD

[76] Inventors: Kevin M. Conway, 130 Walnut Ct., Santa Rosa, Calif. 95404; Daniel C. Swann, 1876 London Rach Rd., Glen Ellen, Calif. 95442

[21] Appl. No.: 905,024

[22] Filed: Jun. 26, 1992

[51] Int. Cl.[5] .............................................. G06F 1/00
[52] U.S. Cl. .................................. 364/708.1; 361/680
[58] Field of Search .......................... 364/708; 341/22; 400/472, 479, 482, 488, 489; 361/393

[56] References Cited

U.S. PATENT DOCUMENTS

| | | | |
|---|---|---|---|
| 3,940,758 | 2/1976 | Margolin | 364/708 X |
| 4,509,873 | 4/1985 | Ryan | 400/472 X |
| 4,597,681 | 7/1986 | Hodges | 400/488 |
| 5,067,834 | 11/1991 | Szmanda et al. | 400/472 X |
| 5,109,354 | 4/1992 | Yamashita et al. | 364/708 X |
| 5,119,078 | 6/1992 | Grant | 400/488 X |

OTHER PUBLICATIONS

"Briefcase-portable textwriter with 100-key full-size keyboard", IBM Tech Disclosure Bull. vol. 27, No. 4A, Sep. 1984, pp. 2002-2004.

*Primary Examiner*—Tan V. Mai
*Attorney, Agent, or Firm*—Larry D. Johnson

[57] ABSTRACT

A laptop computer and keyboard provides an improved assembly of a central processing unit (CPU) housing, keyboard and screen, utilizing a keyboard having a right and left hand pair of keyboard portions or halves joined together in a non-planar (V-shaped or open-book shaped) arrangement along a common edge or by a connecting member. Both sides of each keyboard half preferably contain at least one key or input control, such that the entire desired array of keys is disposed about the four surfaces (i.e., two front sides and two back sides) and/or edges.

8 Claims, 8 Drawing Sheets

LAPTOP COMPUTER WITH HINGED KEYBOARD

This application is related to copending application Ser. No. 07/905,019, filed Jun. 26, 1992, by Kevin M. Conway, one of the joint inventors herein, for a COMPUTER KEYBOARD.

BACKGROUND OF THE INVENTION

1. Field of the Invention

This invention relates generally to computers and their peripherals, and more specifically to an improved portable computer and its associated ergonomic keyboard.

2. Description of the Prior Art

Computer keyboards are well known, and typically consist of a flat, generally rectangular rigid "slab" bearing one hundred or more keys, including standard letter keys (in a "QWERTY" or other arrangement), number keys, punctuation keys, function keys, and the like. However, long-term use of such flat keyboards can be awkward and uncomfortable to the user, and may even cause physical problems such as Carpal Tunnel Syndrome and related disorders.

Laptop computers typically consist of a CPU housing (usually including disk drives, batteries, ports, and other appropriate hardware), a keyboard, and a screen, which components are either integral or connected together in a folding arrangement. However, the necessarily small size of the keyboard portion in a laptop computer makes it particularly difficult for the user's hands to access the keys, and exacerbates the physical problems associated with any traditional keyboard.

SUMMARY OF THE INVENTION

The laptop computer and keyboard of this invention provides an improved assembly of a central processing unit (CPU) housing, keyboard and screen, utilizing the ergonomic shape and structure for a keyboard described in copending patent application Ser. No. 07/905,019. The instant invention provides for the hinged/pivotable attachment of that novel keyboard to a discrete computer screen, or a discrete computer screen and CPU housing, to greatly enhance the usability of laptop (portable) computer.

The inventive keyboard comprises a right and left hand pair of keyboard portions or halves joined together in a non-planar (V-shaped or open-book shaped) arrangement along a common edge or by connecting member. Each keyboard half portion thus has a front side and a back side, with the angular relationship between the two keyboard halves defining a pair of inside surfaces on the back sides (with the contained angle between the two inside surfaces being less than 180 degrees) and a pair of outside surfaces on the front sides (with the relative angle between the two outside surfaces being greater than 180 degrees). Both sides of each keyboard half preferably contain at least one key or input control, such that the entire desired array of keys is disposed about the four surfaces (i.e., two front sides and two back sides) and/or edges.

The user may place the thumb and fingers of each hand on the right and left hand portions of the keyboard, in the manner of holding an opened book, such that the keys on the front sides/outside surfaces and top edges of the keyboard halves are accessible to the user's fingers, and the keys on the back sides/inside surfaces and side edges of the keyboard halves are accessible to the user's thumbs or fingers. This "book-shaped" structure allows neutral positioning of the user's wrist and forearms, and enables a comfortable working position for the user which relieves stress to the neck, back, shoulders, arms, wrists, and hands.

DETAILED DESCRIPTION OF A PREFERRED EMBODIMENT

Figure 1A:
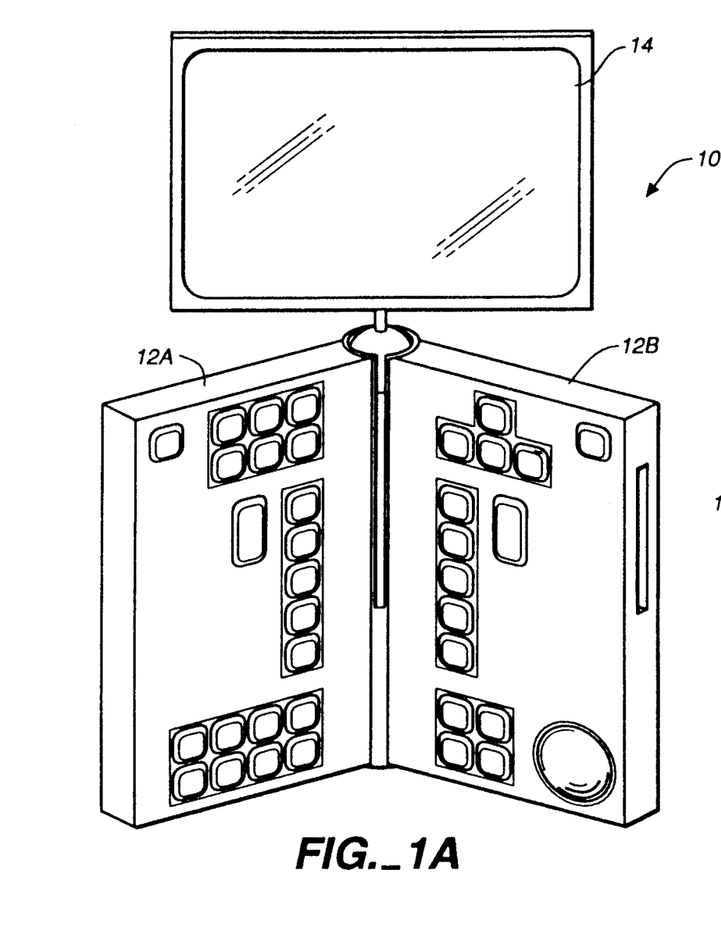
FIGS. 1A-1D are a series of perspective views depicting the folding of a simple keyboard+screen embodiment of the laptop computer and keyboard of this invention, in which the CPU and associated hardware are contained within the keyboard.
Figure 1B:
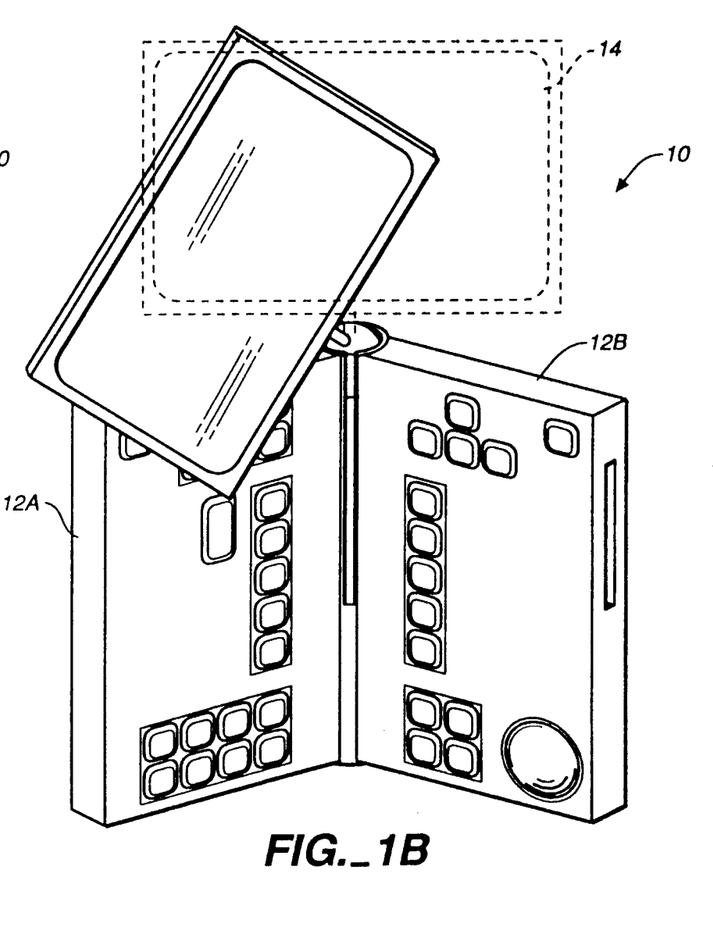
Figure 1C:
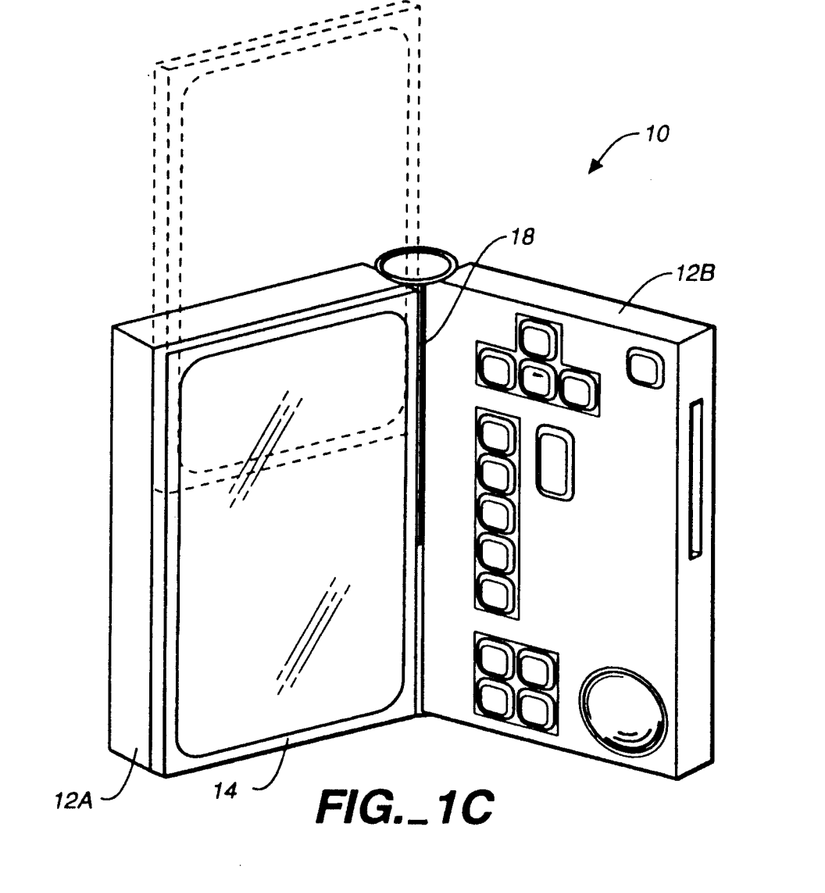
Figure 1D:
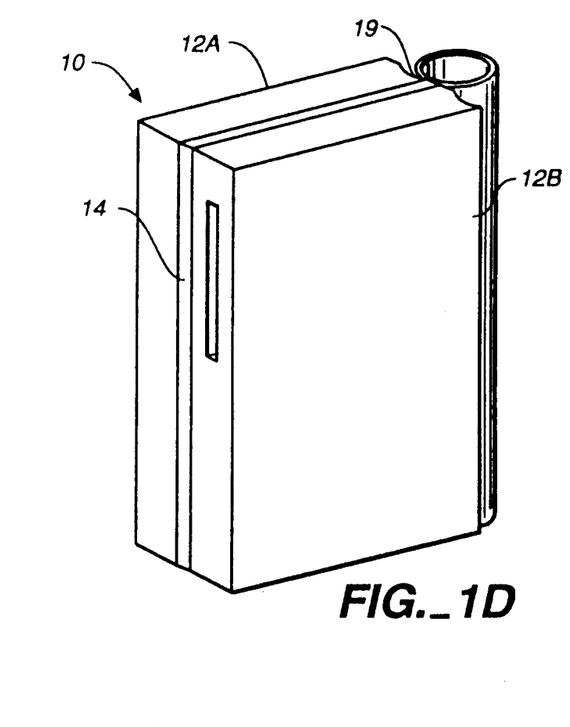

FIGS. 1A-1D are a series of perspective views depicting the folding of a simple keyboard+screen embodiment 10 of the laptop computer and keyboard of this invention, in which the CPU and associated hardware are contained within the keyboard;

FIG. 1A illustrates the unit 10 in use with the keyboard halves 12a, 12b opened and screen 14 erected;

FIG. 1B illustrates the screen 14 laterally pivoting about the screen/keyboard pivot axis 16 for angular alignment of the plane of the screen between the inside surfaces of the keyboard halves 12a, 12b, and downward pivoting of the screen body about the screen/keyboard pivot axis towards registration with the keyboard halves;

FIG. 1C illustrates the screen 14 sliding along the screen/keyboard track 18 to complete vertical registration of the screen body with the inside surfaces of the keyboard halves; and FIG. 1D illustrates the keyboard halves 12a, 12b closed together about the keyboard hinge axis 19, capturing the screen 14 between their respective inside surfaces.

This embodiment is the smallest version, folding up to be about the size of a paperback book. The keyboard is the computer, as all of the necessary disk drives, circuits, connectors, trackball and batteries are in the two keyboard halves. The screen pivots at the top of the hinge that connects the keyboard halves, and can be adjusted to exactly the correct angle for viewing. To fold the computer up, the screen turns and then slides down between the keyboard halves, and the halves close. A soft case would protect the exposed keys, just like a calculator case.

Figure 2A:
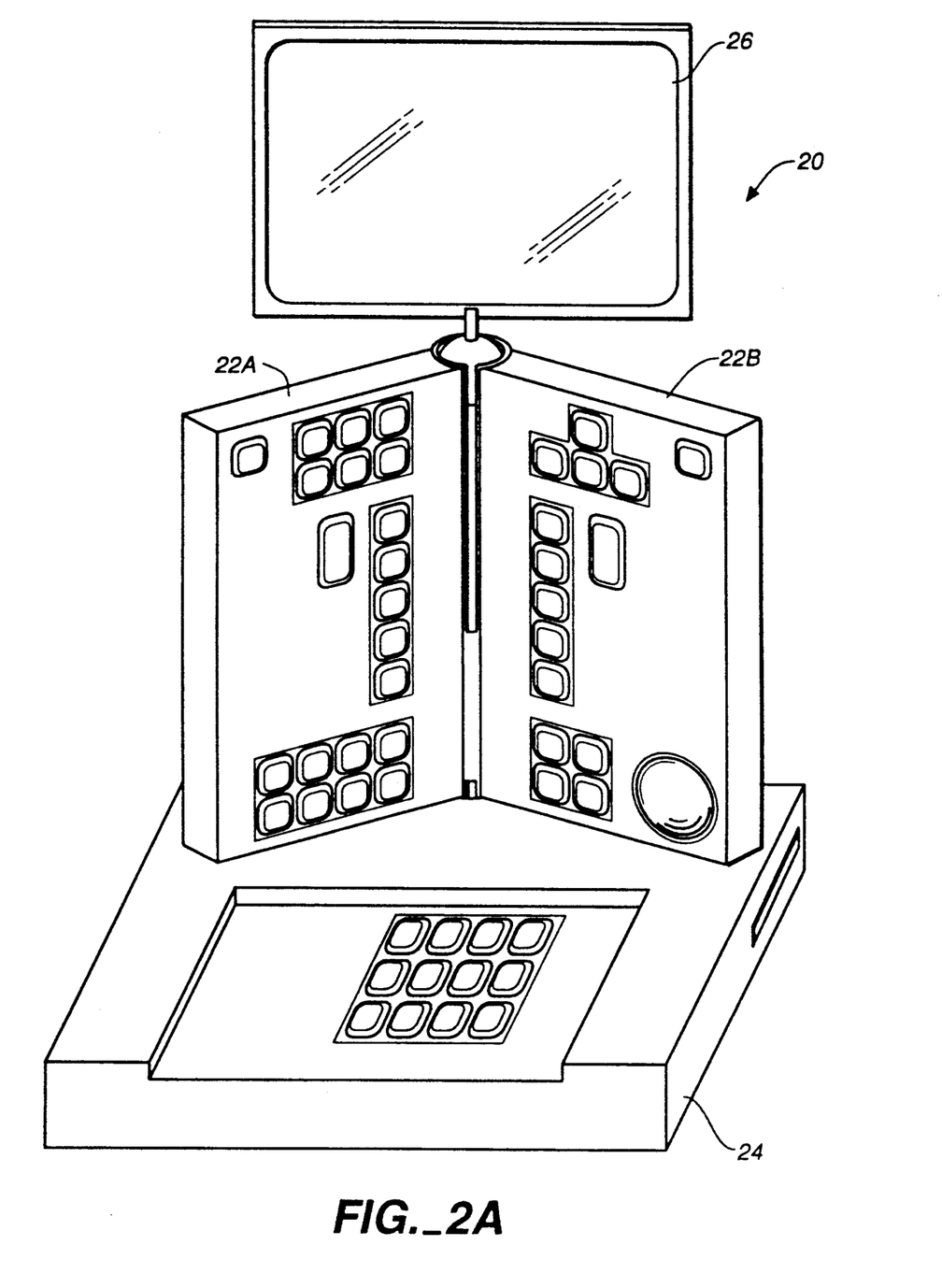
FIGS. 2A-2D are a series of perspective views depicting the folding of a discrete CPU housing-+keyboard+screen embodiment of the laptop computer and keyboard of this invention.
Figure 2B:
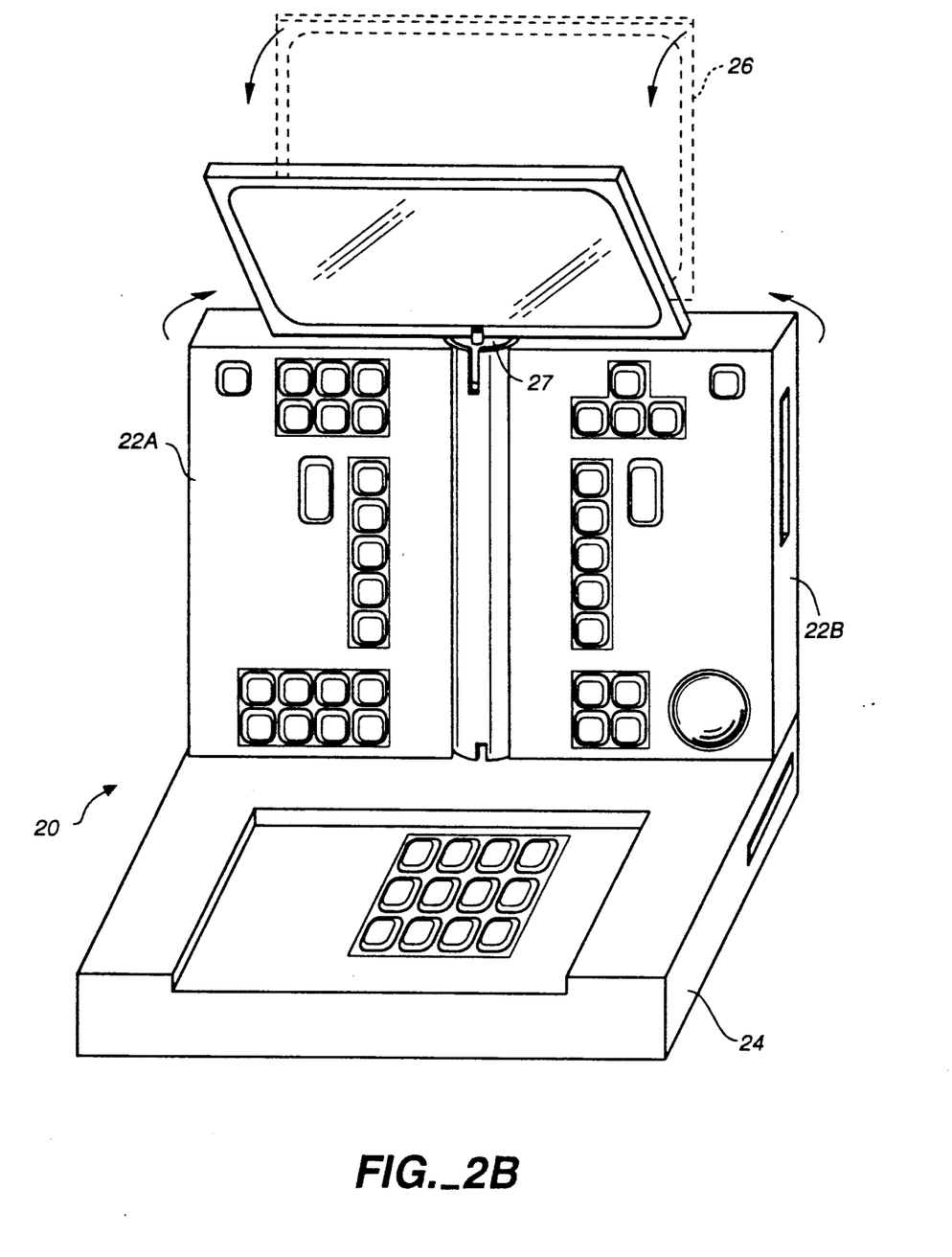
Figure 2C:
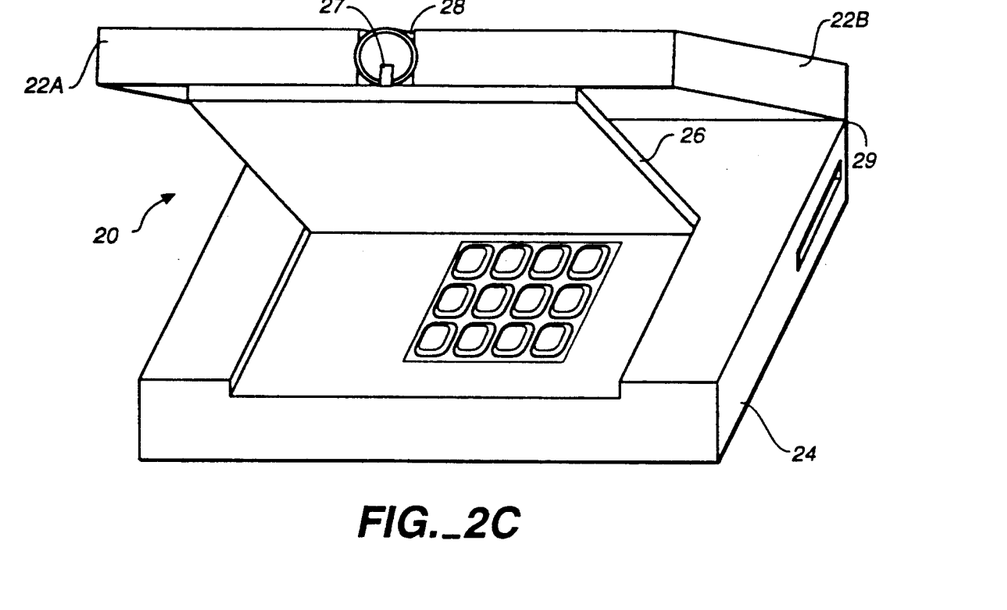
Figure 2D:
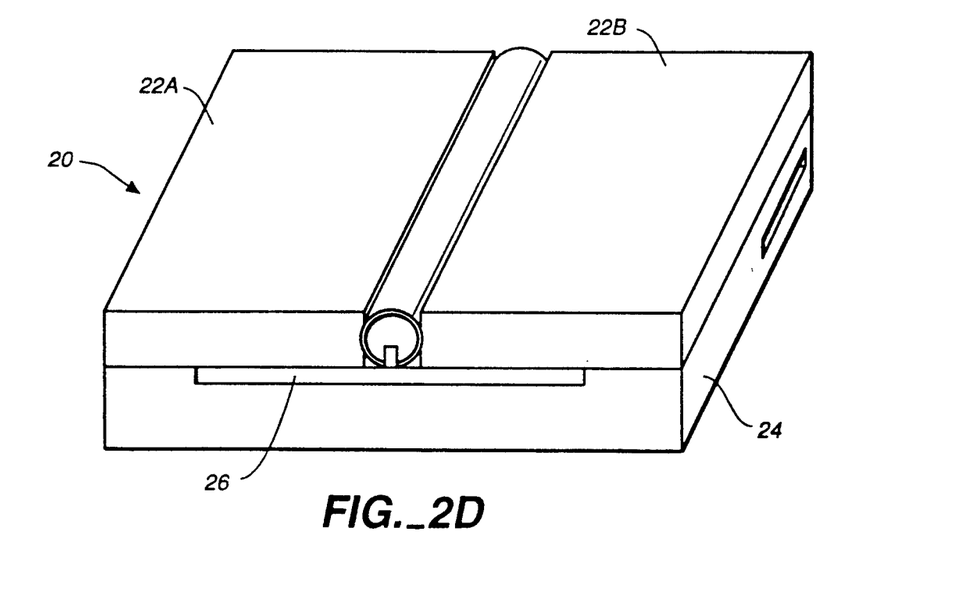

FIGS. 2A-2D are a series of perspective views depicting the folding of a discrete CPU housing-+keyboard+screen embodiment 20 of the laptop computer and keyboard of this invention;

FIG. 2A illustrates the unit 20 in use with the keyboard 22a, 22b opened atop the CPU 24 and the internally folding screen 26 erected atop the keyboard;

FIG. 2B illustrates the screen pivoting about the screen/keyboard pivot axis 27 towards juxtaposition with the keyboard halves 22a, 22b;

FIG. 2C illustrates the keyboard halves 22a, 22b having been moved about the keyboard hinge axis 28 to be coplanar, and pivoting of the aligned keyboard halves and screen 26 towards juxtaposition with the CPU 24 about the keyboard/CPU pivot axis 29; and FIG. 2D illustrates the aligned keyboard halves 22a, 22b closed together against the CPU 24 about the keyboard/CPU pivot axis, capturing the screen 26 between their respective inside surfaces.

This version has a base or housing which supports the computer on a lap or table. The base provides a place for batteries, disk drives, circuitry, connectors, trackball, additional keys, a writing pad for a pen based software system, and disk storage. To fold up the computer the screen would fold down in front, and the base would fold up to cover the screen. The screen and base could be detached from the keyboard and attached together, and the keyboard operated remotely from the base and screen with a keyboard operated remotely from the base and screen with an infrared or other communication link. The ability to separate the keyboard halves from the screen and base would allow the placing of the screen and base on an airplane tray table or on a table, so that the user could just hold the keyboard.

Figure 3A:
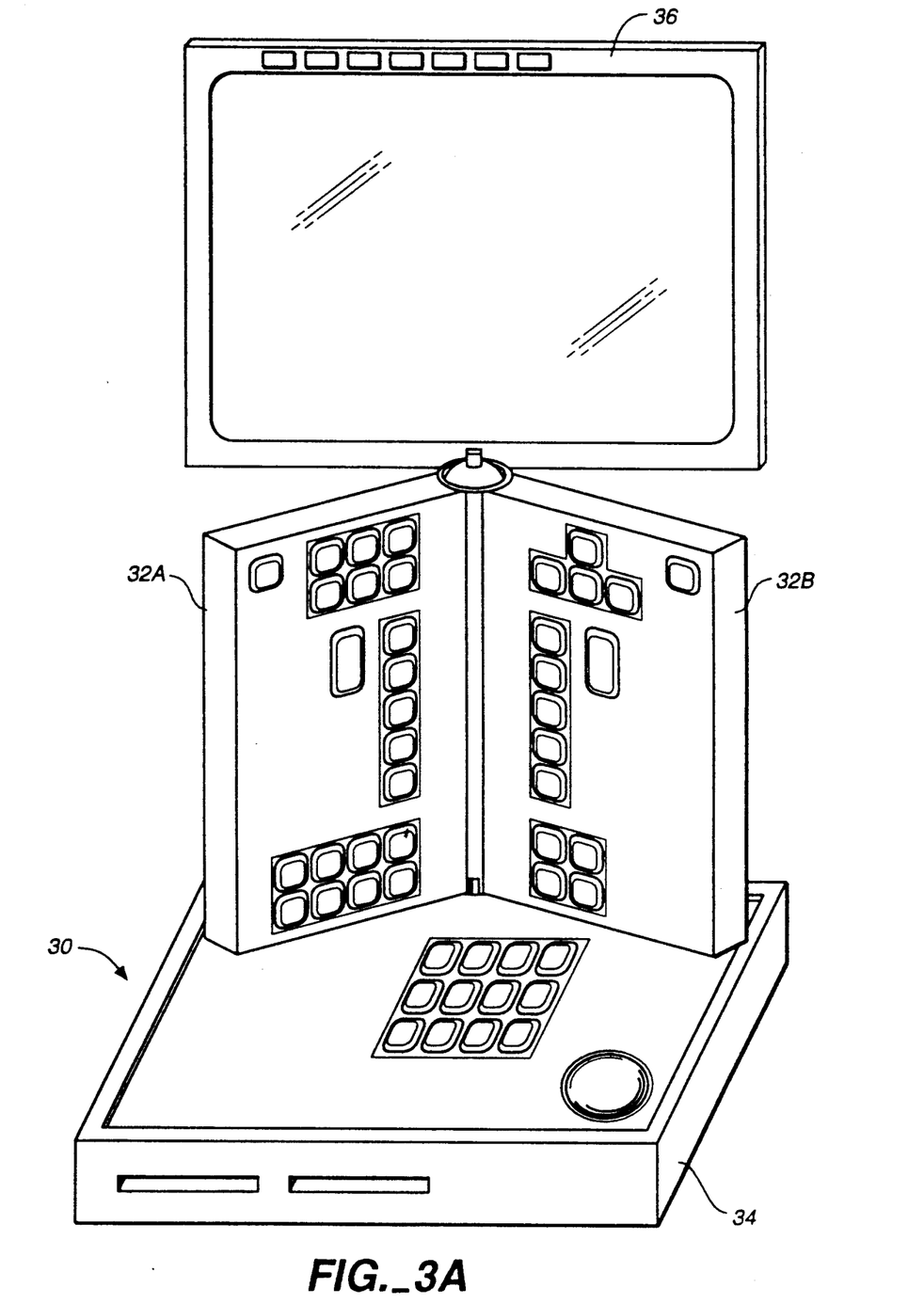
FIGS. 3A-3D are a series of perspective views depicting the folding of an alternate version of a discrete CPU housing+keyboard+screen embodiment of the laptop computer and keyboard of this invention.
Figure 3B:
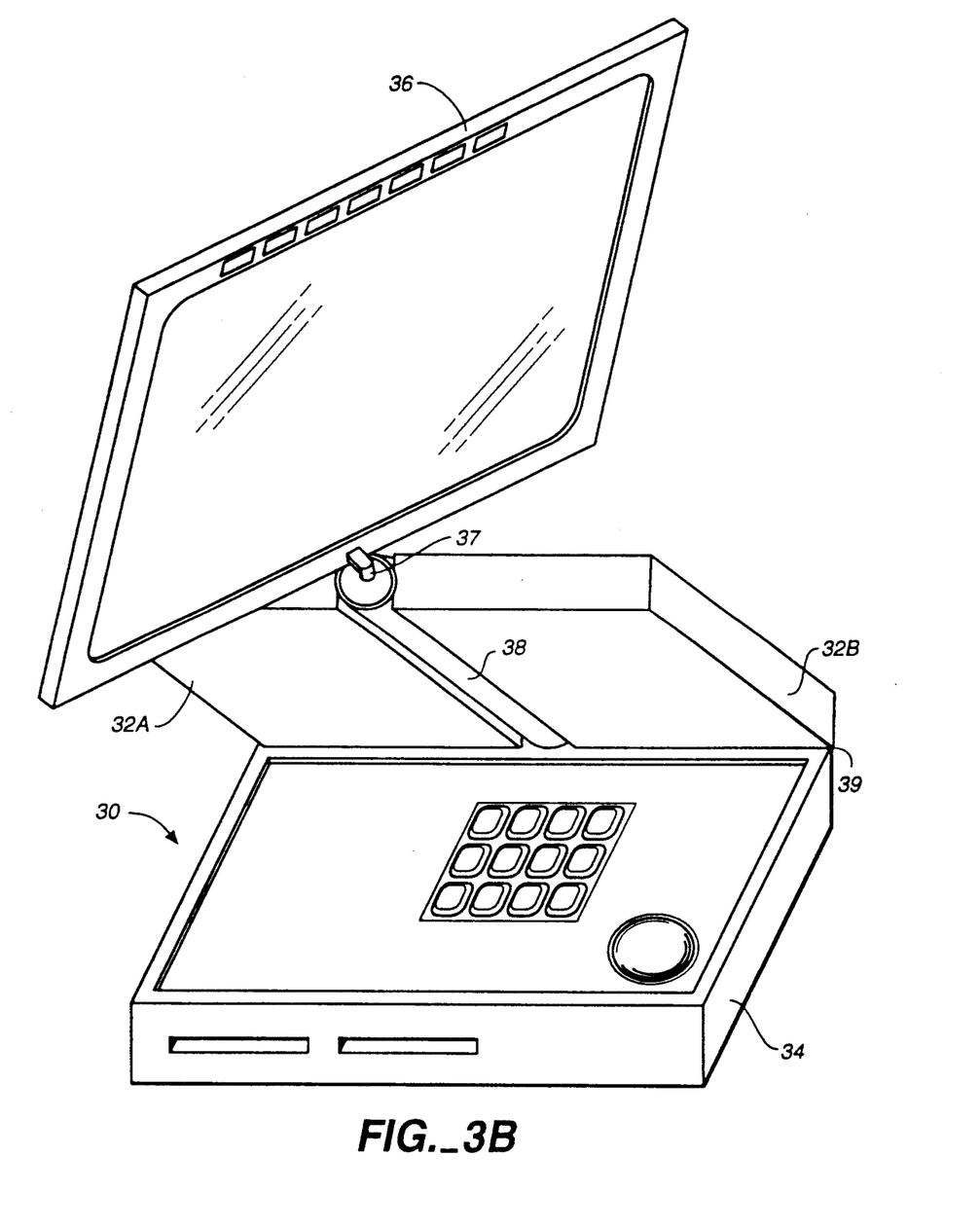
Figure 3C:
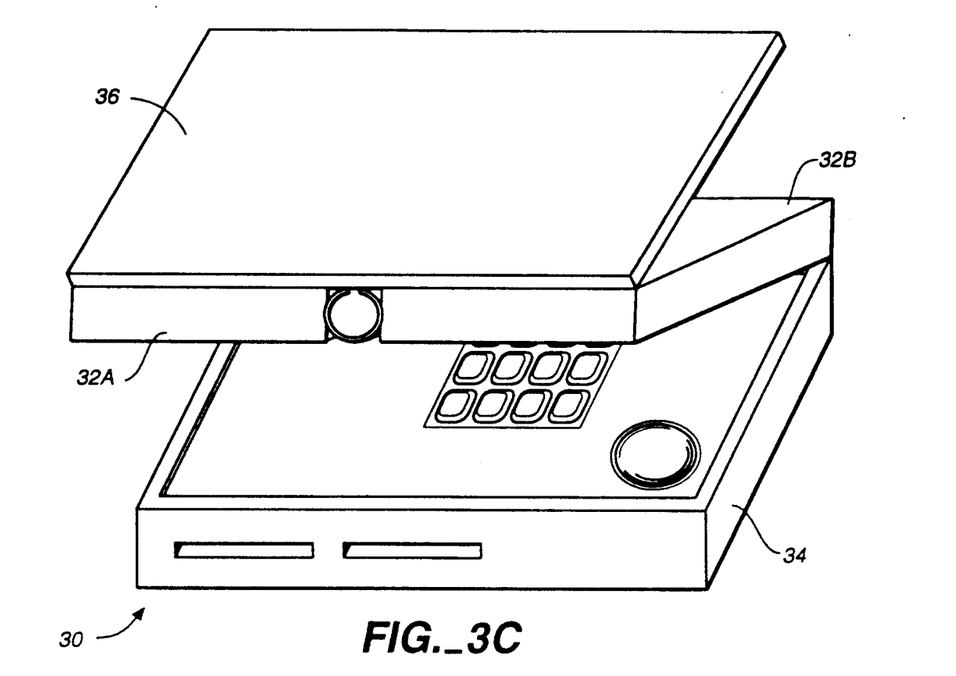
Figure 3D:
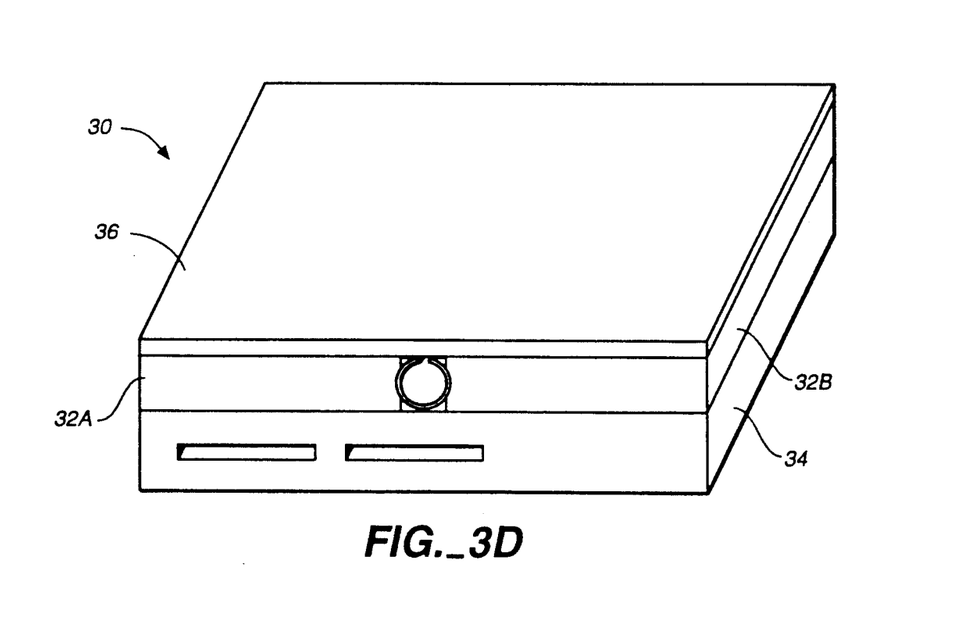

FIGS. 3A-3D are a series of perspective views depicting the folding of an alternate version of a discrete CPU housing+keyboard+screen embodiment 30 of the laptop computer and keyboard of this invention;

FIG. 3A illustrates the unit 30 in use with the keyboard halves 32a, 32b opened atop the CPU 34 and the externally folding full-size screen 36 erected atop the keyboard;

FIG. 3B illustrates the screen 36 pivoting about the screen/keyboard pivot axis 37 towards juxtaposition with the keyboard halves 32a, 32b, which have been brought into alignment by movement about the keyboard hinge axis 38, and moved towards juxtaposition with the CPU 34 about the keyboard/CPU hinge axis 39;

FIG. 3C illustrates the screen 36 pivoting towards juxtaposition and registration with the outside surfaces of the aligned keyboard halves 32a, 32b; and FIG. 3D illustrates the aligned keyboard halves closed together against the CPU 34, and the screen 36 closed against the aligned keyboard halves.

This version provides a portable computer with the two halves of the keyboard and a large computer screen attached to the top, and a base which unfolds to provide a flat horizontal area at the bottom of the keyboard halves. A hard disk, optical disk, floppy disk(s), batteries, and any other desired components fit into the base. A mouse/trackball, or additional keys, such as a number pad pattern can also be in the base. The base and the screen could be as large as the two halves of the keyboard when it is opened up flat. This configuration allows for the maximum amount of volume for the computer hardware, and the largest possible screen.

Further alternatives include:

In any of the above configurations, the keyboard could be connected to an external computer, with the keyboard acting as an input keyboard for the external computer.

In any of the above cases, the keyboard could be held and the screen and the base (in any) could be placed on a table.

In any of the above configurations, the keyboard could be supported by an external articulated arm attached to a desk or table, and the display could stand on the table separate from the keyboard and if there is a base it could either stay attached to the keyboard or be unattached and sit on the table, and the display could be attached to the base.

In any of the above case the parts of the computer that are detached can be operated by wireless remote, so that no wire connections are necessary.

While this invention has been described in connection with preferred embodiments thereof, it is obvious that modifications and changes therein may be made by those skilled in the art to which it pertains without departing from the spirit and scope of the invention. Accordingly, the scope of this invention is to be limited only by the appended claims.

What is claimed as invention is:

1. A laptop computer comprising:
   a first keyboard half portion having a front side, back side, top, bottom and perimeter edge, side front side bearing at least one keyboard key;
   a second keyboard half portion having a front side, back side, top, bottom and perimeter edge, said front side bearing at least one keyboard key;
   keyboard hinge means for connecting said first keyboard half portion and said second keyboard half portion in non-planar relationship, wherein when said keyboard halves are grasped by a user's hands, said keyboard keys on said keyboard half portions front sides are accessible to the user's fingers, and said keyboard half portions back sides are accessible to the user's thumbs;
   a computer screen; and
   screen hinge means for connecting said computer screen to said keyboard half portions proximate said top.

2. The laptop computer of claim 1 wherein said first and second keyboard half portion perimeter edges bear at least one keyboard key accessible to the user's thumbs.

3. The laptop computer of claim 1 wherein said first and second keyboard half portions back sides bear at least one keyboard key accessible to the user's thumbs.

4. The laptop computer of claim 1 wherein at least one of said keyboard half portions bears a trackball/mouse control.

5. A laptop computer comprising:
   a first keyboard half portion having a front side, back side, top, bottom and perimeter edge, said front side bearing at least one keyboard key;
   a second keyboard half portion having a front side, back side, top, bottom and perimeter edge, said front side bearing at least one keyboard key;
   keyboard hinge means for connecting said first keyboard half portion and said second keyboard half portion in non-planar relationship, wherein when said keyboard halves are grasped by a user's hands, said keyboard keys on said keyboard half portions front sides are accessible to the user's fingers, and said keyboard half portions back sides are accessible to the user's thumbs;
   a computer screen;
   screen hinge means for connecting said computer screen to said keyboard half portions proximate said top;
   a CPU housing:
   CPU housing hinge means for connecting said CPU housing to said keyboard half portions proximate said bottom.

6. The laptop computer of claim 5 wherein said first and second keyboard half portion perimeter edges bear at least one keyboard key accessible to the user's thumbs.

7. The laptop computer of claim 5 wherein said first and second keyboard half portions back sides bear at least one keyboard key accessible to the user's thumbs.

8. The laptop computer of claim 5 wherein at least one of said keyboard half portions bears a trackball/mouse control.

* * * * *